May 8, 1928.
W. L. RICE
1,668,821
MEANS FOR SIGNALING AUTOMOBILE TIRE DEFLATION
Original Filed Jan. 29, 1927
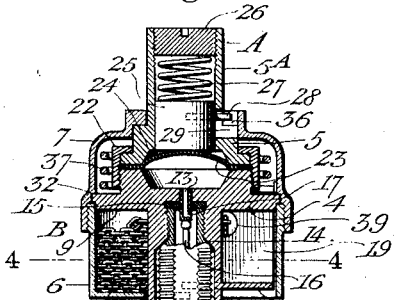
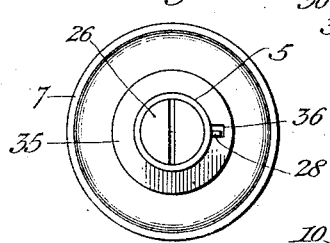
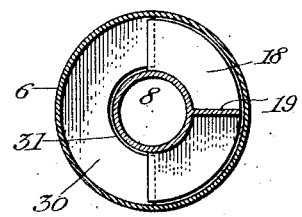
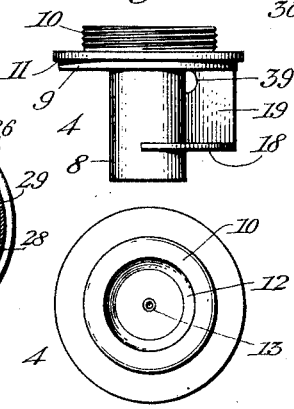
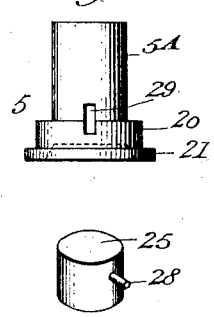
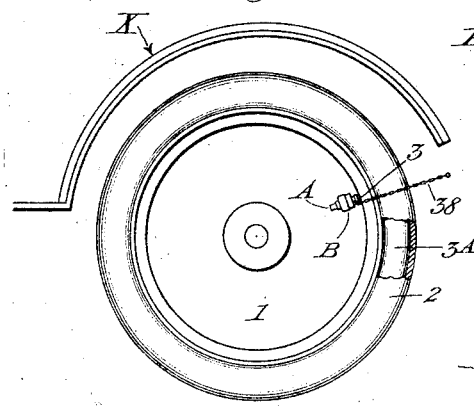
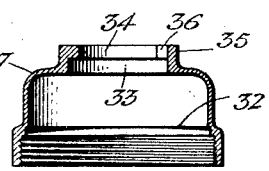
Inventor
Walter L. Rice.
By H. S. Bailey Attorney.

Patented May 8, 1928.

1,668,821

UNITED STATES PATENT OFFICE.

WALTER L. RICE, OF DENVER, COLORADO.

MEANS FOR SIGNALING AUTOMOBILE TIRE DEFLATION.

Application filed January 29, 1927, Serial No. 164,485. Renewed March 19, 1928.

This invention relates to improvements in means for signaling automobile tire deflation.

The main object of the invention is to provide mechanism which is connected with the usual inner tube air valve, and which includes a housing for retaining a chain, one end of which is anchored within the housing; whereby, deflation of the tire while the car is in motion causes said housing to release the chain which is thrown out under centrifugal action, its free end striking against the adjacent fender, as the wheel rotates, thereby notifying the occupant of the car of said tire deflation.

Further, to provide a device of this character comprising a fixed member adapted to be secured upon the air valve of a tire, and a spring operated member rotatable upon the fixed member, and forming therewith a housing for a chain, one end of which is anchored to the fixed member; an air controlled spring operated latch being arranged to hold the rotatable member against movement, under normal air pressure in the tire, and to permit a half rotation of the same under partial deflation of the tire, thereby to open the housing and release the chain, the free end of which strikes against the adjacent fender, as the wheel rotates, and signals the fact of the deflation of the tire.

These objects are accomplished by the device illustrated in the accompanying drawings in which:—

Figure 1, is a sectional view of the improved device, showing the same secured upon the air valve of a pneumatic tire.

Figure 2, is a plan view of the same.

Figure 3, is also a plan view, the rotatable member being in section to disclose its operating spring.

Figure 3ᴬ, is a sectional view through one part of the rotatable member.

Figure 4, is a horizontal sectional view on the line 4—4 of Figure 1.

Figure 5, is a side view of that section of the fixed member which is adapted to be secured upon the air tube.

Figure 6, is a plan view of the same.

Figure 7, is a side view of the other section of the fixed member.

Figure 8 is a perspective view of the plunger form of latch for locking the rotatable member with respect to the fixed member, and Figure 9, is a side view of an automobile wheel and its fender showing the application of the improved tire deflation signaling device.

The purpose of the present invention is to eliminate the chance of injury to pneumatic tires resulting from driving the car after a tire has become partially or wholly deflated, as by means of the present invention, the driver of a car is instantly notified of any decrease of pressure in a tire due to a puncture or other cause, and therefore can take steps to remedy the trouble before the tire has become injured.

Referring to the accompanying drawings: The numeral 1 indicates an automobile wheel, including the tire 2, and 3 the usual air valve which is connected to the inner tube 3ᴬ and extends out through the felly in the usual manner. Upon the air valve is secured the improved signaling device, which comprises a fixed member A made up of parts 4 and 5, and a member B which is rotatably mounted on the member A and is made up of parts 6 and 7.

The part 4 of the member A is connected to the air valve, in a manner to be presently described, and comprises a tubular portion 8, which terminates at its inner end in a flange 9 having an externally threaded boss 10, the flange 9 being stepped to form a shoulder 11. The boss 10 is provided with an axial recess 12 having a central hole in which is tightly secured a nipple 13, which projects into the inner end portion of the bore of the tube 8. The main portion of the bore of the tube 8, is smooth and of a diameter to receive the air valve 3. The inner end portion of the main bore terminates in a conical shoulder 14 and the remainder of the bore is of reduced diameter and is threaded. The end of the air valve is reduced and threaded and is screwed into this threaded portion, and against a rubber washer 15 which abuts against the end wall of the said bore.

The washer 15 has an axial hole through which the nipple 13 passes. This nipple extends into the air valve and its outer end is closed and bears against the end of the usual valve steam 16 of the air valve, for a purpose to be presently explained. The portion of the nipple entering the air valve, has a lateral hole 17 which forms communication between the air valve and the bore of the nipple, so that air can pass from the valve through the nipple, as will hereinafter appear. The tube 8, near its outer end, is formed with a semicircular flange 18, which is connected to the flange 9 by a integral web 19, which extends from the tube to the edge of the flange and divides the flange into two equal parts, as clearly shown in Figures 4 and 5.

The part 5 of the member A comprises a tubular portion 5^A which is formed on one end with a circular enlargement 20, which terminates in a flange 21 of the same diameter of the boss 10 of the part 4, and the parts 4 and 5 are connected by a union 22, one end of which is formed with an introverted flange which surrounds the enlargement 20 and rests upon the flange 21, while its other end is internally threaded to screw upon the boss 10 and thus connect the parts 4 and 5. A rubber diaphragm 23 is clamped between the flange 21 and the boss 10, and the flange 21 is formed with an axial recess 24 which opens into the bore of the tube 5^A, and forms, with the recess 12 in the part 4, a chamber, which permits movement of the diaphragm in either direction. A cylindrical plunger 25 is mounted in that end of the tube 5^A next the diaphragm 24; the opposite end of the said tube is closed by a threaded adjustable plug 26, and an expansion coil spring 27, is interposed between the plug 26 and the plunger 25. A radial latch pin 28 projects from the plunger, and extends through a slot 29, which is formed partly in the tube 5^A and partly in the enlargement 20, as most clearly shown in Fig. 7. From the foregoing, it will be seen that when the member A is screwed upon the air tube, the closed end of the nipple 13 will bear upon and depress the valve stem 16, thereby opening the air valve, and air from the inner tube passes through the nipple to the outer side of the diaphragm 24, which is thereby expanded against the plunger 25, which is under tension of the spring 27 which exerts a pressure on the plunger sufficient to equalize the normal pressure in the inner tube.

A lock nut 3^A on the air valve 3, is screwed against the end of the tube 8, thereby preventing accidental disconnection of the device from the said air valve.

The part 6 of the member B is cylindrical in form and acts in connection with the part 4 of the member A to form a housing for a chain, to be later described, and its outer end is formed with a half round introverted flange 30, which acts in connection with the half round flange 18 of the part 4, to normally confine the chain within the housing. The flange 30 is outside the flange 18 and the straight edges of these flanges overlap slightly as shown in Fig. 4, and the flange 30 has a semicircular recess 31, which partially surrounds the tube 8 of the part 4. The upper edge or rim of the part 6, surrounds the stepped portion of the flange 9 of part 4 and bears against the shoulder 11, and this rim portion is externally threaded and screws into the open end of the part 7 of member B. The part 7 has an annular shoulder 32, which overlaps the flange 9, so that the flange is confined between the rim of the part 6, and the said shoulder 32, as clearly shown in Fig. 1. The opposite end of part 7 has a circular recess 33 in which is a circular hole 34 through which the tube 5^A of part 5 passes, while the enlargement 20 of the said part 5, fits in the said recess 33, and forms a bearing for the part 7. The hole 34 is surrounded by a boss 35, in which is formed a notch or recess 36, which normally registers with the slot or recess 29 in the enlargement 20 of the part 5. When the plunger 25 is at the limit of its inward movement, under normal air pressure in the inner tube, the pin 28 in said plunger, rests in the notch 36—see Fig. 1—and turning movement of the part B upon the part A, is thereby prevented.

The turning of part B is effected by a coil spring 37 which is housed in the part 7 and surrounds the union 22. This spring is under torsional tension, one of its ends being secured in any suitable manner to the said union 22, while its other end is secured to the part 7; and when decreased air pressure in the tire permits outward movement of the plunger under pressure of its spring 27, the pin 28 moves out of the notch 36, and the spring 37, turns the member B a half rotation on the member A whereby the flange 30 of the part 6, will be under the flange 18 of the part 5, thus making a half round outlet opening in the chain housing. One end portion of a chain 38, is looped around the tube 8, a hole 39 being formed in the web 19, for this purpose, and the remainder of the chain, which is long enough to reach from the housing to the point X on the fender, is confined within the housing, by the semicircular flanges 18 and 39, and in this position of the flanges, as shown in Fig. 4, the notches 29 and 36 register. The device is then secured upon the air tube, as above described; the air valve stem 16 is depressed by the nipple 13 and air from the inner tube expands the diaphragm 23, thereby sliding the plunger 25 until its pin 28 engages the upper end of the slot 29, and at the same time, rests in the notch or recess 36 in the boss of the part 7, thereby holding the member B against rotation.

In practice, one of the improved devices is secured upon the air tube of each tire, as illustrated in Fig. 9, and as long as the air in the tubes remains under normal tire expanding pressure, the chain housings remain closed and the chains are confined therein. But when a leakage occurs in a tire, by reason of a puncture or other cause, the air pressure upon the diaphragm 23 is thereby reduced, whereupon, the spring 27 acts to force the plunger 25 out until the pin 28 passes out of the notch 36, in the boss of part 7, and instantly the spring 37 turns the member B upon the member A, thereby opening the chain housing. The chain then pays out, under centrifugal action and its free end passes under the adjacent fender, but as the curve of the fender is eccentric to that of the tire; the outer end of the fender being further from the tire than its inner end; the end of the chain will not contact with the fender until it swings to about the point X, at which point it strikes the fender and drags upon the same until it escapes the inner end of the said fender, thus producing a succession of sharp rattling sounds which give warning to the driver of the car that a tire has become deflated, and thus enabling him to make necessary repairs, before the tire has sustained any serious injury, as frequently happens, when a car is unintentionally driven with one or more flat tires.

Having described by invention, what I claim as new and desire to secure by Letters Patent, is:—

1. In a device of the character described; the combination with a fender, a wheel including a tire, and its air valve; of a stationary member on the air valve, a member rotatable upon the stationary member and forming therewith a housing means for partially rotating the same, means operated by air from said valve, for locking the rotatable member against movement, means for moving the locking means to release the rotatable member when the air pressure thereon is decreased, thereby to effect the opening of said housing, and flexible means secured at one end in said housing, and which is payed out under centrifugal action, the free end of said flexible means engaging said fender as the wheel rotates.

2. In a device for signaling automobile tire deflation, the combination with a wheel having a pneumatic tire and air valve, and a fender; of a member secured upon said valve having an air chamber communicating therewith, a diaphragm in said chamber under air pressure from said valve, a member rotatable upon the first member and forming therewith a housing, a spring actuated latch operated by said diaphragm to normally lock the rotatable member against movement, and to release the same when the air pressure on the diaphragm is decreased, thereby permitting rotary movement thereof to open said housing, and a chain secured at one end in said housing, which is forced out under centrifugal action, the free end thereof engaging said fender as the wheel rotates.

3. In a device for signaling automobile tire deflation, the combination with a wheel having a pneumatic tire and air valve, and a fender; of a stationary member on said air valve having a chamber communicating with said valve and a diaphragm therein under air pressure, a spring-actuated member rotatable upon the stationary member and forming therewith a housing having a normally closed outlet; a plunger in the stationary member operated in one direction by said diaphragm, a latch on said plunger to engage the rotatable member and prevent movement of the same during normal air pressure from the tire, a spring to move the plunger upon a decrease of air pressure on the diaphragm, thereby to permit movement of the rotary member, to open said housing, a chain secured at one end in said housing which is thrown out under centrifugal action, the free end thereof engaging the fender as the wheel rotates.

4. In a device for signaling automobile tire deflation, the combination with an inner tube air valve; of a member secured thereon having a chamber, a diaphragm in said chamber under air pressure from said tube, a plunger in said member which is moved in one direction by said diaphragm, and having a latch pin, a spring actuated cylindrical member rotatably mounted on the first member and forming therewith a housing, said member having cooperating semi-circular ends which normally close the housing, the rotatable member having a notch which is normally engaged by said latch pin, a spring to move said plunger upon decrease of air pressure upon said diaphragm, whereby the latch pin releases the rotatable member, which is turned to open said housing, and a chain secured at one end in said housing, which is thrown out under centrifugal action.

5. In a device for signaling automobile deflation, the combination with an inner tube air valve, of a stationary member on the air valve having an air chamber, a flexible diaphragm therein under air pressure from the tube, a spring actuated member rotatable thereon and forming therewith a housing, means operated by the diaphragm for normally locking the rotatable member against movement, means for releasing the locking means under decreased air pressure on the diaphragm, whereby the rotatable member turns to open the housing, and a chain which is secured at one end in the housing, and flies out under centrifugal action.

6. A device for signaling automobile tire deflation, comprising a two part member adapted to be secured upon the inner tube air valve, a flexible diaphragm between said parts under air pressure from said valve, and means for clamping said parts upon said diaphragm, a two-part spring actuated cylinder member rotatably mounted on the first member and forming therewith a housing having a normally closed outer end, a plunger latch held by said diaphragm to normally lock the rotatable member against rotation, a spring to move the plunger and free the rotatable member, when the air pressure on the diaphragm is diminished, thereby to open the outer end of the housing, and a chain secured at one end in said housing which flies out under centrifugal action.

7. In a device of the character described, a two-part member comprising connected body portions having registering recesses forming a chamber and alined tubular members extending from the body portion, one of which is adapted to be secured upon the air valve of a pneumatic tire, a flexible diaphragm in said chamber and clamped between said body portions, and under air pressure from said valve; a plunger in the other tubular portion which is normally depressed by said diaphragm, said plunger having a latch pin, a spring for imparting a counter movement to the plunger under diminished air pressure upon the diaphragm, a spring operated cylindrical member rotatably mounted on the two-part member and forming therewith a housing having a normally closed outer end, said rotatable member being normally held against turning by said latch pin, and released by said pin under diminished air pressure on the diaphragm, thereby to open the housing, and a chain secured at one end in said housing, which is thrown out under centrifugal action.

8. In combination with the air valve of a pneumatic tire and a valve stem therein; of a stationary member secured upon said valve having a chamber, a nipple extending from said chamber, and bearing upon said valve stem to depress the same and admit air to said chamber, a flexible diaphragm in said chamber, a spring actuated member rotatable upon the stationary member, and forming therewith a housing having a normally closed outer end, a slot being formed in the stationary member and a notch normally registering therewith being formed in the stationary member, a plunger in the stationary member having a latch pin extending through said slot and into said notch, and moved by said diaphragm to hold the rotatable member normally against movement, a spring for moving said plunger in a counter direction, under diminished air pressure on the diaphragm, thereby to move the latch pin out of the notch and permit rotation of the movable member to open said housing, and a chain secured at one end in said housing, which is forced out under centrifugal action, and makes a signal noise by striking a fixture on the car.

9. In a device for signaling automobile tire deflation, a stationary member adapted to be secured upon the air valve of a tire, a member movable thereon and forming therewith a housing having a normally closed outer end, a slidable latch in the stationary member under air pressure from the tire, which normally locks the member, means for moving said latch when the air pressure thereon is diminished, thereby to permit movement of the movable member to open the housing, and a chain secured at one end in said housing, which flies out under centrifugal action thereby to strike an object and signal tire deflation.

10. In a device for signaling automobile tire deflation, the combination with a wheel having a pneumatic tire and air valve, and a fender; of a member secured upon said valve having an air chamber communicating therewith, a diaphragm in said chamber under air pressure from said valve, a member movable upon the first member, and forming therewith a housing, a spring actuated latch operated by said diaphragm to normally lock the movable member, and to release the same when the air pressure on the diaphragm is decreased, thereby permitting movement thereof to open the housing, and a chain secured at one end in the housing, which is forced out under centrifugal action, the free end thereof engaging said fender as the wheel rotates.

In testimony whereof, I affix my signature.

WALTER L. RICE.